UNITED STATES PATENT OFFICE.

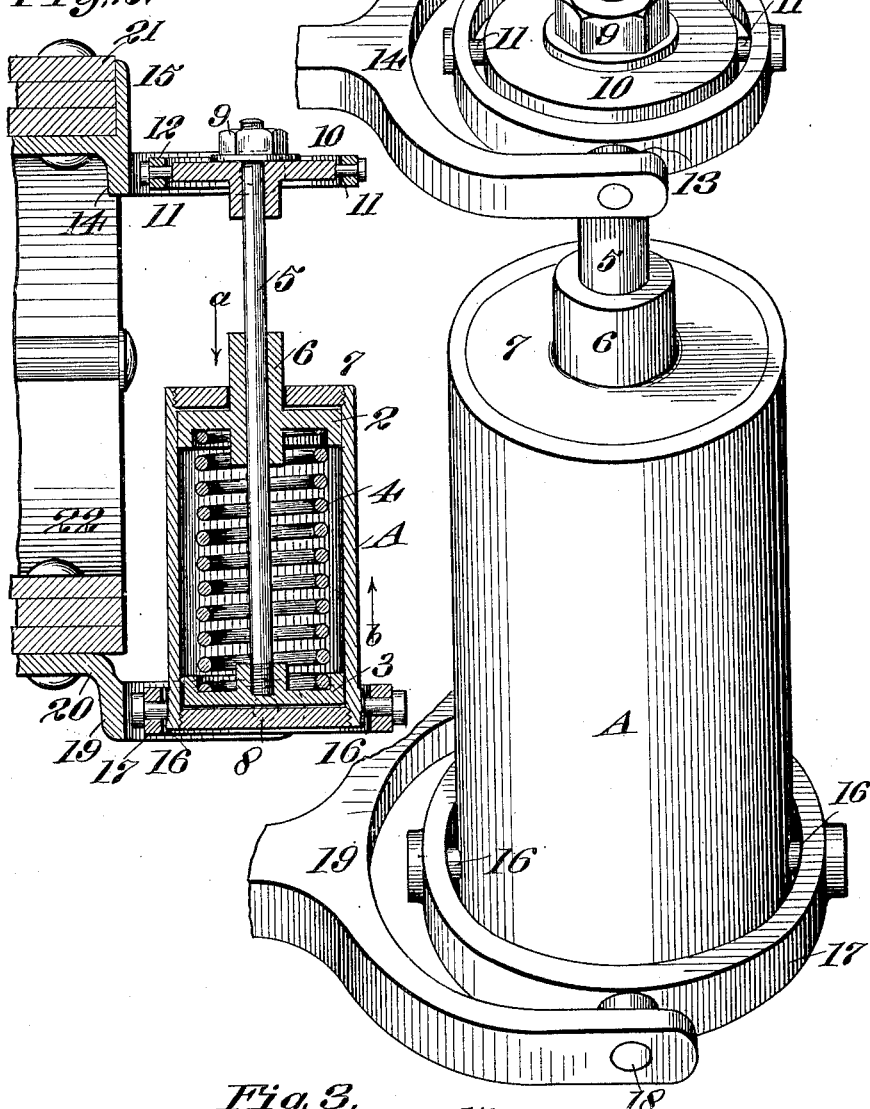

JAMES N. LEWIS, OF SAN FRANCISCO, CALIFORNIA.

VEHICLE SPRING SHOCK-ABSORBER.

1,089,363.  Specification of Letters Patent.  Patented Mar. 3, 1914.

Application filed January 6, 1913. Serial No. 740,391.

*To all whom it may concern:*

Be it known that I, JAMES N. LEWIS, a citizen of the United States, residing in the city and county of San Francisco and State of California, have invented new and useful Improvements in Vehicle Spring Shock-Absorbers, of which the following is a specification.

This invention relates to shock absorbers. It is the object of this invention to provide a simple, substantial and compact shock absorber, which is so constructed that it may be mounted in any convenient position between the chassis and running gear.

Another object of the invention is to provide a universal connection which will allow the device to move freely in all directions with relation to the chassis and running gear without disturbing the resistance or checking action of same; this being of considerable importance when it is considered that under stress of travel the vehicle is constantly subjected to side lunges and jolts in every direction.

A further object of the invention is generally to improve this class of shock absorbers so as to increase their utility, durability, and efficiency.

The invention consists of the parts and the construction and combination of parts as hereinafter more fully described and claimed, having reference to the accompanying drawings, in which—

Figure 1 is a perspective view of the device. Fig. 2 is a vertical section showing its application. Fig. 3 is a side elevation showing the application of the device.

Referring to the drawings A indicates a cylindrical casing in which is slidably mounted a pair of compression heads 2 and 3, between which is interposed a coil spring 4. The lower compression head 3 is attached to the end of a vertically disposed rod 5, guided and slidably mounted in an annular extension 6 forming a part of the upper compression head 2; the normal position of the oppositely mounted compression heads 2 and 3 being controlled by the casing heads 7 and 8, which may be secured on the cylinder in any suitable manner. The upper end of the rod 5 is provided with an adjustable head or stop 9 in the form of a nut; the rod being threaded to receive the nut. Slidably mounted on the upper end of the rod 5 is a disk 10, here shown as being pivotally mounted as at 11 in an annular, concentrically mounted ring 12, which in turn is pivotally mounted as at 13 in a forked extension 14, forming part of a suitably shaped clip 15 which may be secured to the upper spring or body portion of the vehicle. The lower end of the cylindrical casing is mounted in a manner similar to the upper end of the rod 5; the casing being pivotally mounted as at 16 in a concentrically positioned ring 17, which in turn is pivotally mounted as at 18 in a forked extension 19 forming part of the lower clip 20, which may be attached to the lower spring or axle of the vehicle.

The universal mounting of the upper and lower portions of the device have proven of great advantage, as it allows the shock absorber to move freely in all directions with relation to the chassis and running gear; this being of great advantage when it is taken into consideration that the chassis is constantly subjected to side lunges and jolts in every direction when operating a car over the average roadway. The universal connection shown between the upper and lower parts of the device will thus allow the cylindrical casing to assume any angular position without resisting or checking the efficiency of the resisting spring 4 within the casing.

A device constructed as here shown is not only provided with means for checking or deadening the rebound motions of the chassis with relation to the running gear, but is also operable to check or resist any of the severe or violent jolts to which the vehicle may accidentally be exposed.

Under normal operating conditions it will be seen that the spring 21 will be free to play up and down with relation to the lower spring 22; its upward and downward movements being in no way resisted by the shock absorber, as the disk 10, which is secured to the forked extension 14, will simply slide up and down on the rod 5 between the head 9 and the annular projection 6 on the upper compression head; the distance between the annular projection 6 and the upper compression head representing the normal play of the spring. However, it can readily be seen that the moment the vehicle is subjected to an excessive jolt, which will compress the spring more than normal, that the disk 10 will be thrown into engagement with the annular projection 6 forming part of the compression head 2, which in turn is slidably mounted upon the rod 5 and forces this downwardly in the direction of arrow *a* and compresses the spring 4, thus assisting to check or resist any excessive downward movement of the spring 21 with relation to the axle or the lower spring 22. The rebound of the spring 21 is checked when the disk engages with the head 9 on the upper end of the rod 5, which is secured to the lower compression head 3. The upper movement or rebound of the spring will thus be transmitted through the head 9, rod 5, and lower compression head 3 to lift the compression head in the direction of arrow *b* and compress the spring in the opposite direction, and thus deaden or resist any excessive upward or rebound movements of the springs.

The shock absorber here shown is simple and compact in construction; being provided with means which allows it to move freely in any direction, and will always be efficient in any position. This shock absorber takes no more space than the usual forms of shock absorbers, and may be positioned in any convenient place between the running gear and chassis. The materials and finish of the several parts are such as experience and judgment of the manufacturer may dictate.

Having thus described my invention, what I claim and desire to secure by Letters Patent, is—

1. A shock absorber comprising in combination, a cylindrical casing, compression heads slidably mounted in each end of said casing, a coil spring interposed between said heads, a rod secured to the lower compression head which extends through the upper compression head and casing, a head portion formed on the upper end of the rod, a clip or bracket having a forked extension secured to the chassis, a similar clip having a forked extension secured to the running gear, a universal connection pivoted in the last named forked extension in which the lower end of the cylindrical casing is mounted, and a universal connection pivotally mounted in the upper forked extension in which the upper end of the rod is slidably mounted.

2. The combination with the chassis and running frame of a vehicle, of a shock absorber comprising a cylindrical casing, compression heads mounted in each end of said cylinder, a coil spring interposed between said heads, a rod secured in the lower compression head upon which rod the upper compression head is slidably mounted, an annular extension formed on said upper head, an adjustable stop secured on the upper end of the rod, a disk slidably mounted upon the rod between said annular extension and rod head, a clip having a forked extension secured to the upper spring or the chassis, a universal connection connecting the disk with the forked extension, a clip having a forked extension secured to the lower spring on the running gear, and a universal connection connecting the lower end of the cylindrical casing with the last named forked extension.

In testimony whereof I have hereunto set my hand in the presence of two subscribing witnesses.

JAMES N. LEWIS.

Witnesses:
 JOHN H. HERRING,
 W. W. HEALEY.

Copies of this patent may be obtained for five cents each, by addressing the "Commissioner of Patents, Washington, D. C."